United States Patent [19]

Golestani

[11] Patent Number: 5,050,161
[45] Date of Patent: Sep. 17, 1991

[54] CONGESTION MANAGEMENT BASED ON MULTIPLE FRAMING STRATEGY

[75] Inventor: S. Jamaloddin Golestani, Morristown, N.J.

[73] Assignee: Bell Communications Research, Inc., Livingston, N.J.

[21] Appl. No.: 445,784

[22] Filed: Dec. 4, 1989

[51] Int. Cl.[5] .......................................... H04Q 11/04
[52] U.S. Cl. .................................... 370/60; 370/85.6; 370/118; 340/825.51
[58] Field of Search ...................... 370/60, 94.1, 85.15, 370/94.3, 85.12, 84, 77, 82, 85.6, 100.1, 105.1, 118; 340/825.5, 825.51, 825.06, 825.52

[56] References Cited

U.S. PATENT DOCUMENTS

| | | | |
|---|---|---|---|
| 4,734,908 | 3/1988 | Hedlund | 370/94.1 |
| 4,779,267 | 10/1988 | Limb | 370/94.1 |
| 4,841,523 | 6/1989 | Roffinella et al. | 370/94.1 |
| 4,858,232 | 8/1989 | Diaz et al. | 370/85.15 |
| 4,878,218 | 10/1989 | Takada | 370/94.1 |
| 4,914,650 | 4/1990 | Sriram | 370/60 |

OTHER PUBLICATIONS

"Network Delay Considerations for Packetized Voice", P. M. Gopal and Bharath K. Kadaba, Performance Evaluation, vol. 9 (1988/89), pp. 167-180.
"Guaranteed Delay for Voice Traffic in an Integrated Packet-Switched Network", IBM Technical Disclosure Bulletin, vol. 29, No. 9, Feb., 1987.
J. S. Turner, "New Directions in Communications", pp. 25-32, Proceedings of the International Zurich Seminar on Digital Communications, 11-13 Mar., 1986 (Zurich, Ch) see para. 3.3.1, 3.3.2.
M. G. Hluchyj et al.; "Queueing in Space-Division Packet Switching, pp. 334-343, IEEE INFOCOM '88, The Conf. on Computer Comm.", Proceedings, 7th Ann. Joint Conf. (see FIGS. 1,2; para. 1,2,3).
K. Hajikano et al., "Asynchronous Transfer Mode Switching Arch. for Broadband ISDN", pp. 911-915, IEEE Intl. Conf. on Comm. '88, Digital Tech . . . , Spanning the Univ. 12-15, Jun. 1988, Phila., Pa. (see para. 3.1-4.2).
"A Schedule-Based Approach for Flow-Control in Data Communication Networks", Utpal Mukherji, Ph.D Thesis, MIT, Dept. of Electrical Engineering and Computer Science, Cambridge, Mass., Jan. 6, 1986.

*Primary Examiner*—Douglas W. Olms
*Assistant Examiner*—Alpus H. Hsu
*Attorney, Agent, or Firm*—James W. Falk

[57] ABSTRACT

A congestion control strategy for a packet network comprises an admission policy which controls the admission of packets into the network and a stop-and-go queuing strategy at the network nodes. The congestion control strategy utilizes multiple frame sizes so that certain types of connections can be provided with small queuing delays while other types of connections can be allocated bandwidth using small incremental bandwidth units.

15 Claims, 7 Drawing Sheets

CONGESTION MANAGEMENT BASED ON MULTIPLE FRAMING STRATEGY

RELATED APPLICATION

U.S. Pat. Application Ser. No. 326 027 entitled "Congestion Free Packet Network" and filed on Mar. 20, 1989 for S.J. Golestani is assigned to the assignee hereof and contains subject matter related to the subject matter of the present application. The above-identified application is incorporated herein by reference.

FIELD OF THE INVENTION

The present invention relates to a packet transmission technique for alleviating congestion in a packet switching network. More particularly, the present invention relates to an improved congestion control strategy which provides increased flexibility in determining end-to-end packet delays and increased flexibility in the allocation of transmission bandwidth in accordance with the service requirements of different classes of traffic.

BACKGROUND OF THE INVENTION

The problem of congestion control, or more generally traffic management, is quite significant for packet switching networks. Congestion in a packet switching network stems partly from the uncertainties involved in the statistical behavior of many types of traffic sources. Congestion is also due to the complicated way in which different traffic streams interact with each other within a packet network. Congestion control and traffic management in a broadband integrated service environment is further complicated by the high-speed of transmission and by the diverse mix of traffic types and service requirements encountered in such networks.

Most of the strategies proposed for congestion control in conventional narrowband data networks are closed-loop in nature. This means that feedback information (e.g. acknowledgements) from the destination node or some intermediate nodes are used to decide about the admission of new packets into the network or about forwarding packets from one node to the next. At broadband transmission rates, packet duration, or the time required by a link to serve a packet, is very short. Therefore, propagation delays, when measured in terms of packet duration, are much higher in broadband networks than in conventional narrowband networks. Consequently, in a broadband network, any closed-loop or feedback-based control mechanism will tend to work more slowly and may be unable to keep up with the pace of events occurring in the network.

Services that may be encountered in a broadband integrated services network range from data and voice communications to file transfers, high speed circuit emulations, and different types of video services. These services represent a wide variety of traffic characteristics (e.g. average rate and burstiness) and a wide variety of service requirements (e.g. end-to-end delay, delay jitter, packet loss probability, call blocking probability, and error rate). The tasks of resource management in general and congestion control in particular are more involved in this environment than in a conventional narrowband network. In a wideband integrated service network, control algorithms, besides having to deal with a wide range of traffic characteristics, need to be effective in yielding predictable network behavior and must be flexible in accommodating different service requirements. Traffic management algorithms in a broadband network should also be simple in terms of the processing power required for their execution. The increase in data processing speeds has not kept up with the fast growth of data transmission speeds. Thus, packet processing ability in the network nodes has more and more become the scarce resource. Therefore, the processing required for any control function should be kept to a minimum.

The above-identified patent application discloses a congestion control strategy which has several highly desirable features: it maintains loss-free communications, it provides bounded end-to-end delay, and it is very simple to implement. These features make the strategy an attractive solution for the transmission of real time traffic and other forms of time-critical information in a broadband packet network.

The congestion control strategy of the above-identified patent application is composed of two parts: a packet admission policy imposed for each connection at its source node (i.e. a policy which controls the admission of packets into the network) and a service discipline at the switching nodes named stop-and-go queuing.

Central to both parts of the strategy is the notion of time frames. For this reason the congestion control strategy of the above-identified patent application is known as a framing strategy. On each link in the network, time intervals or frames of durations T are defined. The frames may be viewed as propagating from the transmitting end of a link to the receiving end of the link. Illustratively, the frames may be defined such that the frames on the incoming links at each node are synchronous or the frames on the outgoing links at each node are synchronous.

A stream of packets is defined to be (r,T) smooth when, for fixed length packets, the number of packets in each frame of duration T is bounded by r.T, where r is a rate measured in packets/sec. The packet admission part of the congestion control strategy is based on the foregoing definition of smoothness. In particular, each connection k in the network has a source node and a destination node. The source node for connection k is the network node via which packets belonging to connection k enter into the network from an end user. After a transmission rate $r_k$ is allocated and reserved for a connection k along its path to its destination, the admission of packets to the network from this connection is required to be $(r_k,T)$ smooth. This means that during each frame of duration T, the source node for the connection k admits into the network no more than $r_k \cdot T$ packets and any additional packets are not admitted until the next frame starts. Alternatively, the allocated rate $r_k$ may be required to be large enough so that the stream of packets arriving at the source node and admitted to the network always maintains the $(r_k,T)$ smoothness.

The above-identified packet admission policy guarantees that the traffic stream of connection k, with an allocated rate $r_k$, is $(r_k,T)$ smooth upon admission to the network. If this smoothness property continues to hold as the packet stream of each connection arrives at each intermediate switching node, then the problem of congestion is indeed resolved. Unfortunately, this is not often the case. In a network which utilizes conventional first-in, first-out (FIFO) queuing at the nodes, as packets of a connection proceed from intermediate node to intermediate node, they tend to cluster together and form longer and longer bursts, which bursts violate the original smoothness property.

The stop-and-go queuing technique is an alternative to conventional FIFO queuing which completely solves this problem. In particular, stop-and-go queuing guarantees that once the $(r_k,T)$ smoothness is enforced on all connections k at their source nodes, the property will continue to hold at any subsequent switching node. To facilitate discussion of the stop-and-go queuing scheme, it is useful to consider arriving and departing frames In particular, at each node, the arriving frames are the frames of duration T on the incoming links and the departing frames are the frames of duration T on the outgoing links. Over each link in the network, the frames are viewed as traveling with the packets from one end of the link to the other. Therefore, when there is a propagation delay on link l and a processing delay at the receiving end of link l, which delays have a combined duration of $\tau l$, the frames at the receiving end of link l will be $\tau l$ seconds behind the frames at the transmitting end.

Accordingly, as indicated above, the frames may be defined so that the arriving frames on all incoming links of each node are synchronous with respect to each other or so that the departing frames on all outgoing links of each node are synchronous with respect to each other. However, in general, at a node, the arriving and departing frames are asynchronous with respect to each other.

The stop and go queuing technique is based on the following rule: a packet which arrives at a node on an incoming link during an arriving frame f does not become eligible for transmission from the node until the beginning of the first departing frame on the desired outgoing link which starts after f expires.

As a result of this rule, it follows that:

(i) a packet that has arrived at some node via an incoming link during a particular arriving frame will be delayed and then be transmitted on the appropriate outgoing link in the first departing frame on the outgoing link which starts after the end of the particular arriving frame on the incoming link. (Hence the name stop-and-go queuing);

(ii) the packet stream of each connection k will maintain its original $(r_k,T)$ smoothness throughout the network; and (iii) a buffer with a capacity of at most $$B_l = 3C_l T \qquad (1)$$

per link l is sufficient to eliminate any chance of buffer overflow, where $C_l$ is the capacity of link l.

In a network which utilizes the above described framing congestion control strategy (including the above-described packet admission policy and the above-described stop-and-go queuing strategy), it is useful to consider the tradeoff between queuing delays and flexibility in bandwidth allocation. More particularly, in the above-described congestion control strategy, the queuing delay at all nodes for each connection is given by $$Q = \alpha H T \qquad (2)$$

where $\alpha$ is a constant between 1 and 2 and H is the number of links in the connection (e.g. a connection which utilizes two links has one intermediate node). Equations 1 and 2 indicate that by choosing a sufficiently small frame size T, one can arbitrarily reduce queuing delays as well as buffer requirements in the network.

In addition, for fixed length packets of L bits in length, the incremental unit of bandwidth allocation is $$\Delta r = L/T \text{ bits/sec} \qquad (3)$$

Equation (3) indicates that a small frame size T (and the resulting small buffer requirements and queuing delays) can only be achieved at the expense of a large incremental unit of bandwidth allocation and thus decreased flexibility in bandwidth allocation.

Briefly stated, it is a shortcoming of the above-described framing congestion control strategy that small queuing delays and small buffer capacity requirements can only be achieved at the expense of decreased bandwidth allocation flexibility.

Accordingly, it is an object of the present invention to provide a modification of the above-described framing congestion control strategy so that it is possible to enjoy small queuing delays for certain connections while still being able to allocate bandwidth using arbitrarily small incremental bandwidth units for other connections.

It is a further object of the present invention to provide a framing congestion control strategy which utilizes multiple frame sizes so that some connection can enjoy small queuing delays while other connections can be allocated bandwidth in small incremental units.

SUMMARY OF THE INVENTION

In accordance with the framing congestion control strategy of the present invention, multiple frame types with multiple durations are utilized. In particular, the frame sizes or durations are $T_1, T_2, \ldots T_p, \ldots T_P$ wherein $T_p$ is a multiple of $T_{p+1}$ so that $T_p = M_p T_{p+1}$, where $M_p$ is an integer. On each link in the network time frames of duration $T_p$ are defined. This is repeated for every value of p, illustratively, starting from the same time origin for each link. Illustratively, $P=2$ and $T_1 = 3T_2$. The frames of multiple sizes on each link may be viewed as traveling from the transmitting end to the receiving end of each link. Since, on each link, the multiple frame types have durations which are integrally related and are defined from the same time origin, the multiple frame types on each link are synchronous with respect to each other. The multiple frame types may be defined so that at each node all the arriving frames on the incoming links are synchronous with respect to each other or so that at each node all the departing frames on the outgoing links are synchronous with respect to each other. In general, at a node, arriving and departing frames may be asynchronous with respect to each other.

Every connection in the network is set up as a type-p connection for some $p=1,2 \ldots P$, in which case the connection is associated with the frame size $T_p$.

The multiple frame size congestion control strategy of the present invention involves an admission policy at the source node of each connection, and a stop-and-go queuing technique at each node.

The admission policy requires that the packet arrival of any connection k of type-p with the allocated and reserved transmission rate $r_k$ be $(r_k, T_p)$ smooth. Packets of a type-p connection are referred to as type-p packets, which packet type is indicated in the packet header.

The stop-and-go queuing strategy at the network nodes utilizes the following rules:

(A) A type-p packet which has arrived at a node on an incoming link during an arriving type-p frame f does not become eligible for transmission from the node until the beginning of the first type-p departing frame on the appropriate outgoing link which starts after f has expired.

(B) Any eligible type-p packet has non-preemptive priority over a type-p-1 packet. This means that a higher priority type-p packet which becomes eligible for service by an outgoing link of a node while a lower priority type-p-1 packet is being served, waits until service of the type-p-1 packet is completed before gaining priority over the outgoing link.

As a result of these rules, it follows that:

(i) any type-p packet that has arrived at a node via an incoming link during an arriving type-p frame f, will receive service on a outgoing link during the first departing type-p frame which starts after the incoming type-p frame f has ended;

(ii) the packet stream of each connection will maintain its original smoothness property along its entire path through the network, i.e., for a type-p connection with an allocated transmission rate $r_k$, the packet stream maintains the $(r_k, T_p)$ smoothness throughout its path to its destination;

(iii) a buffer capacity of $$B_l = 3\Sigma C_l^p T_p \qquad (4)$$

per outgoing link l is sufficient to eliminate any chance of buffer overflow, where $C_l^P$ is the capacity of link l allocated to type-p connections. This buffer capacity is always less than $3C_l T_1$.

It is a significant advantage that the multiple frame size congestion control strategy enables certain connections to have very small queuing delays, while for other connections, bandwidth can be allocated in small incremental bandwidth units.

More particularly, the queuing delay $Q^p$ for a type-p connection is given by $$H \cdot T_p < Q^P < 2H \cdot T_p \qquad (5)$$

where H is the number of links of the connection. Thus small frame sizes are utilized for connections which can tolerate only small queuing delays.

With respect to bandwidth allocation, the incremental bandwidth unit for a type-p connection is $$\Delta r^P = L/T_p \text{ bits/sec} \qquad (6)$$

where L is the packet length. Thus for connections which require that bandwidth be allocated in small incremental units, large frame sizes are utilized.

In short, in the multiple frame size congestion control strategy, frame size and queuing delay are coupled together for each connection type individually, rather than globally as is the case for the single frame size case, thereby providing a significant increase in the flexibility of the congestion control strategy.

DETAILED DESCRIPTION OF THE INVENTION

Before describing the present invention in detail, it may be helpful to briefly describe the structure of a packet switching network and the definition of smoothness utilized in the framing congestion control strategy with both single and multiple frame size.

Figure 1:
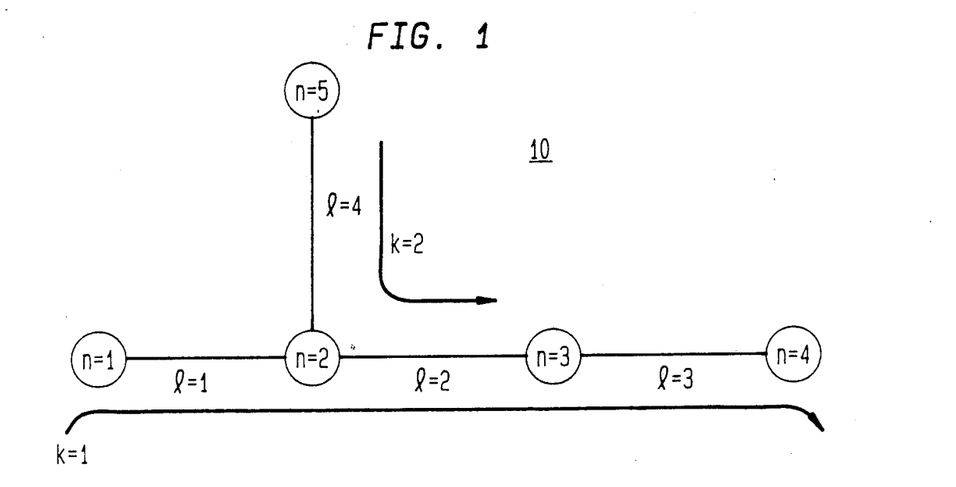
FIG. 1 schematically illustrates a packet switching network and the path of a connection in the network.

FIG. 1 schematically illustrates a packet switching network 10. The network 10 comprises the nodes n=1,2,3,4 and 5 and the links l=1,2,3,4. Illustratively, two connections are shown in FIG. 1. The connection k=1 extends from the source node n=1, through the intermediate nodes n=2 and n=3, and to the destination node n=4. Thus, the connection k=1 utilizes the links l=1,2,3. Similarly, the connection k=2 extends from the source node n=4, through the intermediate node n=2, and to the destination node n=3. Thus, the connection k=2 utilizes the links l=4 and l=2. Each of the connections k in the network is allocated a rate $r_k$ in terms of the number of packets per second.

A packet stream belonging to the connection k and propagating on one of the links l is defined as $(r_k, T)$ smooth if the number of packets in a time frame T does not exceed $r_k \cdot T$. The packet stream is not smooth if the packets are clustered so that for some of the frames the number of packets exceeds $r_k \cdot T$.

Figure 2A:
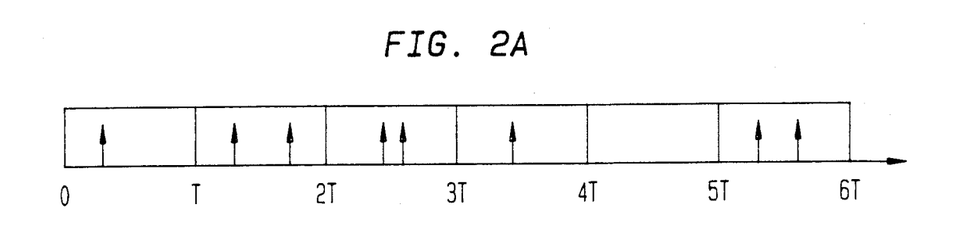
FIG. 2A schematically illustrates a packet stream which is (r,T) smooth for r=2/T and FIG. 2B schematically illustrates a packet stream which is not smooth for r=2/T.
Figure 2B:
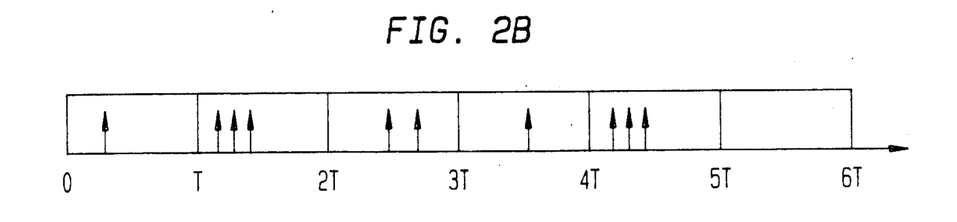

FIG. 2A shows a sequence of frames of duration T on a link l. Each packet being transmitted via the link l is designated with an arrow. The packet stream of FIG. 2A is (2/T,T) smooth since the number of packets in a frame never exceeds $(2/T) \cdot T = 2$. In contrast, the packet stream of FIG. 2B is not (2/T,T) smooth since in the frame [T,2T] and the frame [4T,5T] the packets are clustered so that the number of packets (i.e. 3) exceeds $(2/T) \cdot T = 2$.

As indicated previously, the above mentioned U.S. patent application describes a congestion control strategy for a packet network which comprises a packet admission policy imposed for each connection at the source node, and a queuing strategy to be carried out at the nodes known as stop and go queuing.

The packet admission part of the congestion control strategy is based on the foregoing definition of smoothness. After a transmission rate $r_k$ (in packets per second) is allocated to a connection k, the admission of packets for that connection into the network is required to be $(r_k, T)$ smooth, i.e., during each frame, once the source node for connection k receives $r_k \cdot T$ packets no more packets are admitted to the network for connection k until the next frame starts. Preferably, the allocated rate $r_k$ for a connection k is large enough so that the stream of packets entering the network always maintains the $(r_k, T)$ smoothness.

Figure 3A:
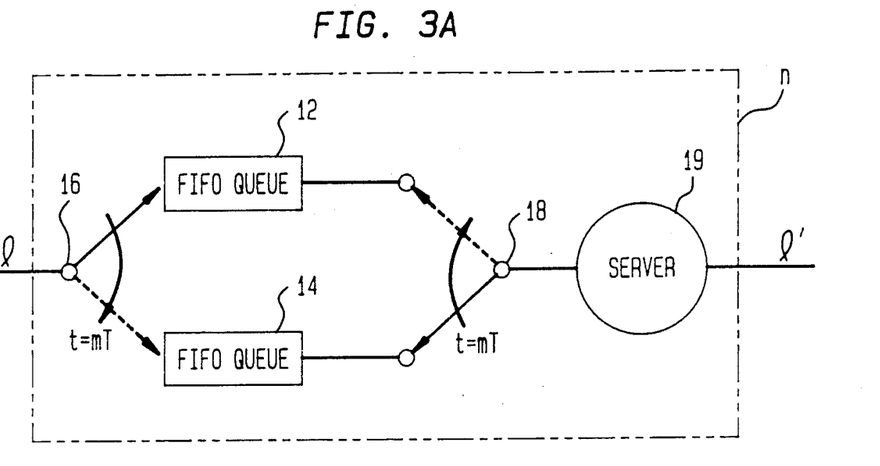
FIGS. 3A and 3B illustrate alternative implementations of a network node for the framing congestion control strategy when there is a single frame size.
Figure 3B:
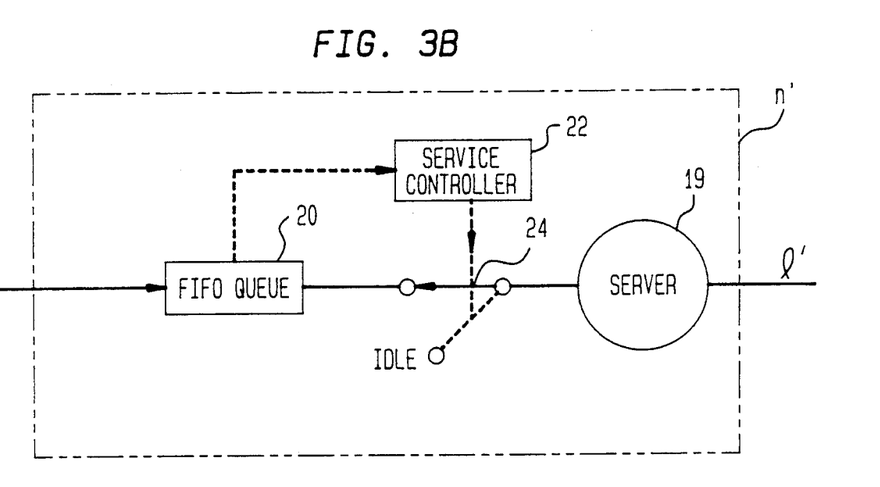

FIG. 3A schematically illustrates a node n for implementing the stop-and-go queuing strategy FIG. 3B shows an alternative node n' for implementing the stop-and-go queuing strategy In FIGS. 3A and 3B, packets arrive at the node n or n' on an incoming link l and packets depart the node n or n, on an outgoing link l'. Typically, a node n or n' has a plurality of incoming links l and a plurality of outgoing links l'. However, for purposes of clarity, only one incoming link and one outgoing link are shown for the nodes n and n'.

Figure 4A:
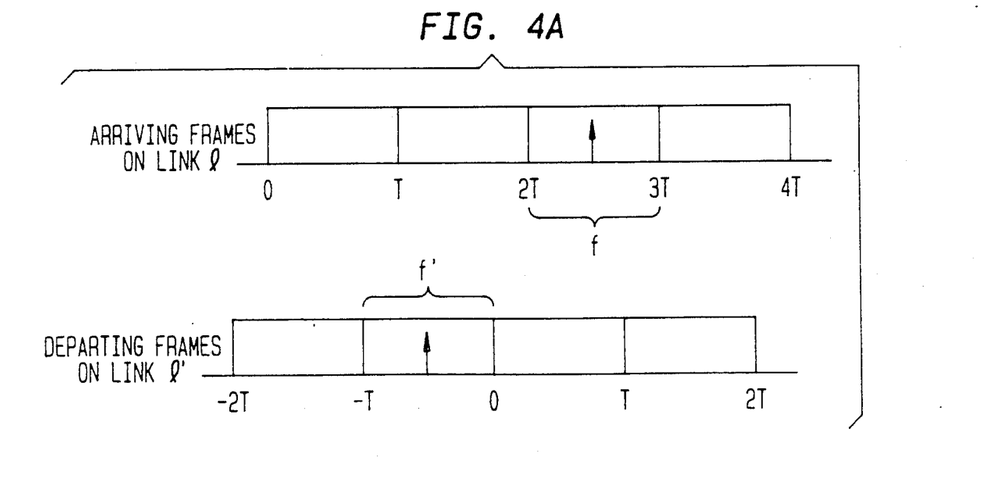
FIGS. 4A and 4B illustrate arriving and departing frames for the nodes of FIGS. 3A and 3B when the arriving and departing frames are asynchronous and synchronous, respectively.
Figure 4B:
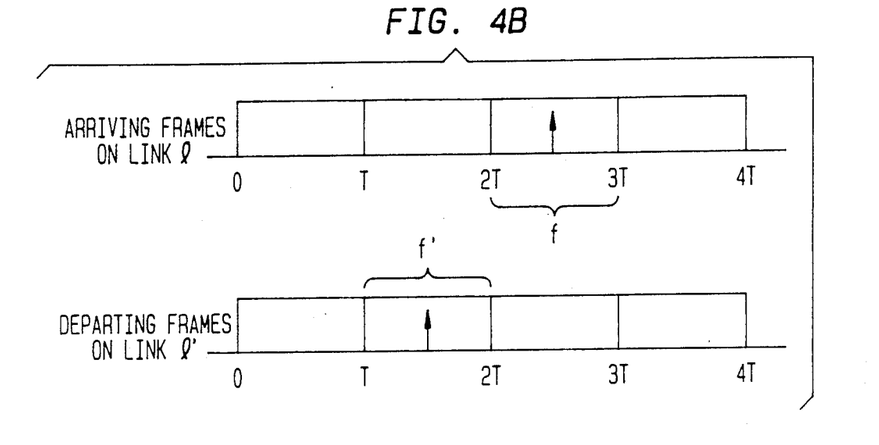

The arriving frames on the incoming link l and the departing frames on the outgoing link l' may be asynchronous or synchronous with respect to each other. Asynchronous arriving and departing frames of duration-T on the links l and l', respectively, are shown in FIG. 4A. Synchronous arriving and departing frames of duration T on the links l and l', respectively, are shown in FIG. 4B.

The stop-and-go queuing rule to be implemented at the nodes may be stated as follows. A packet which arrives at a node on an incoming link l in an arriving frame f is queued at the node and served by the outgoing link l' in the first departing frame f' which starts after the end of the arriving frame f. Examples of arriving and departing frames f and f' are shown in FIGS. 4A and 4B for the asynchronous and synchronous cases.

FIGS. 3A and 3B illustrate node structures n and n' for implementing the stop-and-go queuing strategy in the case where the arriving and departing frames are synchronous.

In FIG. 3A the node n comprises two FIFO queues 12 and 14 and two switches 16 and 18. Thus, during a first frame, the incoming link ( is connected by the switch 16 to the FIFO queue 12 in which arriving packets are stored. During this same first frame, the switch 18 is connected to the FIFO queue 14 so that packets arriving via the link l in the previous frame are served by the server 19 and transmitted via the outgoing link l'. In the next frame, the positions of the switches 16 and 18 are reversed, so that arriving packets are stored in the queue 14 and packets which were stored in the queue 12 during the first frame are served by the server 19 and transmitted via the outgoing link l'. The arrangement of FIG. 3A insures that packets arriving at the node n via the link l during a particular frame are not served by the server 19 and transmitted via the outgoing link l' until the next frame.

The node n' of FIG. 3B accomplishes the same thing using only a single FIFO queue 20. In the node n', at the beginning of each frame, a service controller 22 marks the present load in the queue 22 as eligible. The controller 22 then connects server 19 to the queue 20 via the switch 24 for just the time needed to serve the eligible load. After that, the position of the switch 24 is changed to interrupt service of the queue 20 by the server 19 until the beginning of the next frame so that any packet which is received during the current frame, and therefore not yet eligible for transmission, does not get transmitted before the expiration of the current frame. A modification of the node n' of FIG. 3B for the case where the arriving and departing frames are asynchronous is discussed in the above-mentioned U.S. Pat. application, Ser. No. 326,027.

It should be noted that stop-and-go queuing does not require packets to be served on a FIFO basis. Nevertheless, in particular implementations of stop-and-go queuing nodes, such as the nodes n and n' of FIGS. 3A and 3B, the packets are served on a FIFO basis. This is advantageous because it simplifies implementation of the nodes and insures that packets are delivered in proper order.

As indicated above, the framing congestion control strategy has a number of significant advantages. First, when the admissions policy at the source nodes and the stop-and-go queuing strategy are utilized, the required $(r_k, T)$ smoothness is maintained for each connection in the network over all the links traversed by the congestion. This means that the framing congestion control strategy prevents the clustering of packets, which clustering is a cause of congestion. In addition, a buffer capacity of $2C_iT$ for synchronous arriving and departing frames and at most $3C_iT$ for asynchronous arriving and departing frames is sufficient to eliminate any chance of buffer overflow.

The foregoing packet admission and queuing strategy, besides eliminating buffer overflow, also leads to an attractive property in terms of packet delays. All packets of any given connection undergo the same amount of delay in the network, except for a small jitter. In other words, the end-to-end delay, D', of a packet in a given connection may be represented as $$D' = D + d \qquad (7)$$

where D, defined as the connection delay, is constant for all packets of the connection, and d, the delay jitter, varies from packet to packet. The delay jitter is limited to the size of a frame:

$$-T < d < T \qquad (8)$$

The connection delay D can be broken into two parts:

$$D = t + Q \qquad (9)$$

where t is the sum of the end-to-end propagation and processing delays of a connection and Q represents the total queuing delays of the connection. Furthermore Q is bounded as follows:

$$Q = \alpha HT \qquad (10)$$

where H is the number of links traversed by the connection and $\alpha$ is a constant between 1 and 2.

Figure 5:
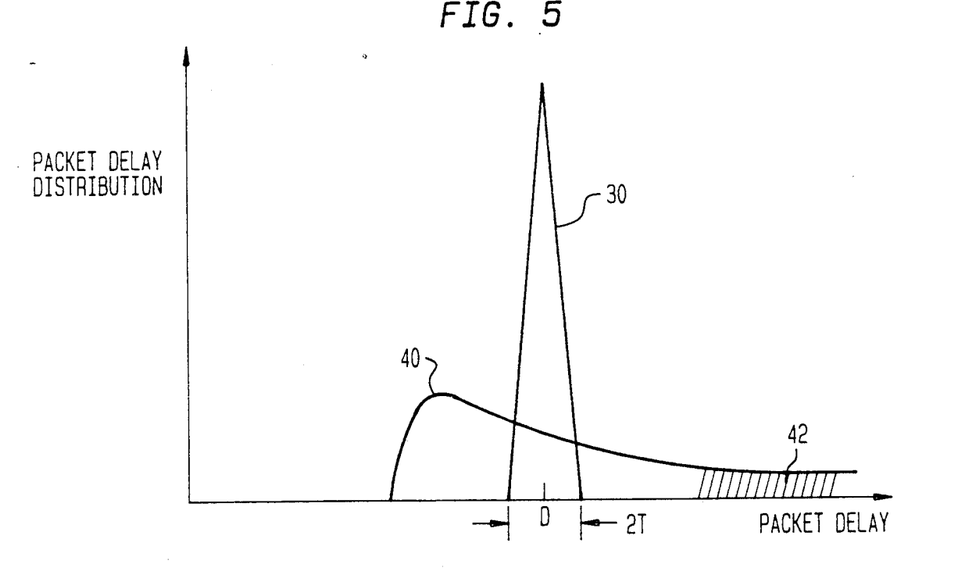
FIG. 5 compares queuing delay distributions for stop-and-go queuing and conventional FIFO queuing.

FIG. 5 compares the packet delay distribution for conventional FIFO queuing with the packet delay distribution of stop-and-go queuing. Thus, in FIG. 5, curve 30 is the distribution of packet delays resulting from stop-and-go queuing and curve 40 is the distribution of packet delays resulting from conventional FIFO queuing. The shaded region 42 roughly corresponds to the fraction of packets that are lost when the conventional FIFO queuing is utilized. While conventional FIFO queuing has a smaller average delay, the delays are distributed over a wide range, which makes the network subject to buffer overflow and packet loss. In contrast, the delay performance of the framing congestion control strategy is within a narrow but acceptable range so that the behavior of the network is predictable and satisfactory.

As indicated above, both the required buffer capacity at each link and the queuing delay Q can be made arbitrarily small, by choosing a sufficiently small frame size T. However, a small frame size T can only be chosen at the cost of reduced flexibility in bandwidth allocation. In particular, the unit of bandwidth allocation is given by $$\Delta = L/T \text{ bits/sec} \quad (11)$$

so that as T decreases $\Delta r$ increases. As a numerical example, for a packet length of L-400 bits and a connection with H=5 links, and for $\alpha=1.6$, the queuing delay Q is 1.6HT. If T=1 msec, the queuing delay is 8 msec and $\Delta r$ is 400 kbits/sec. On the other hand, if a bigger T is chosen (e.g. T=50 msec) to reduce $\Delta r$ to 8 kbits/sec, the queuing delay is 400 msec.

Figure 6A:
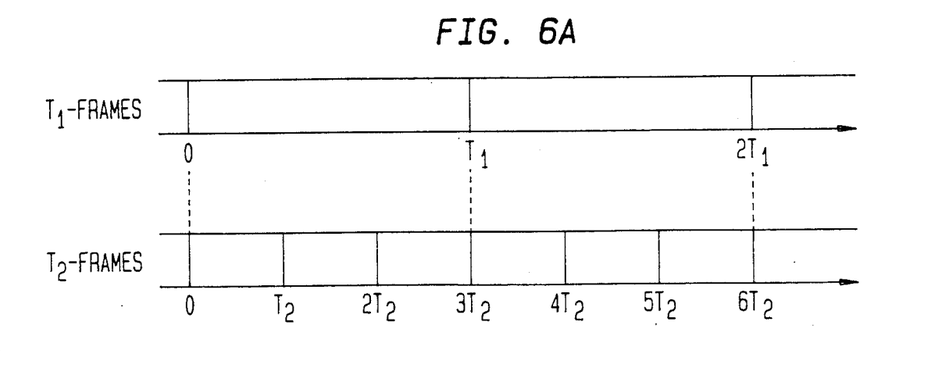
FIG. 6A illustrates multiple frame sizes for use in an illustrative embodiment of the congestion control strategy of the present invention.

This problem is alleviated in accordance with the present invention by utilizing multiple frame sizes. Thus a plurality of frame sizes $T_p$ are chosen with p=1,2 ... P. $T_p$ is a multiple of $T_{p+1}$, i.e., $T_p=M_pT_{p+1}$, where $M_p$ is an integer. Thus, on each link of the network, time frames of duration $T_p$ are defined. This is repeated for every value of p, illustratively, starting from the same time origin on each link. Since, on each link, the multiple frame types have durations which are integrally related and are defined from the same time origin, the multiple frame types on each link are synchronous with respect to each other. The multiple frame types may be defined so that at each node all the arriving frames on all the incoming links are synchronous with respect to each other, or so that at each node all the departing frames on all the outgoing links are synchronous with respect to each other. In general, at a node, arriving and departing frames may be asynchronous or synchronous with respect to each other. FIG. 6A illustrates type-1 frames and type-2 frames on a link for the case where $T_1=3T_2$. Note that in FIG. 6A, the type-1 and -2 frames are synchronous with each other. This occurs because the type-1 and type-2 frames are defined from the same time origin and because $T_1$ is an integer multiple of $T_2$.

Figure 6B:
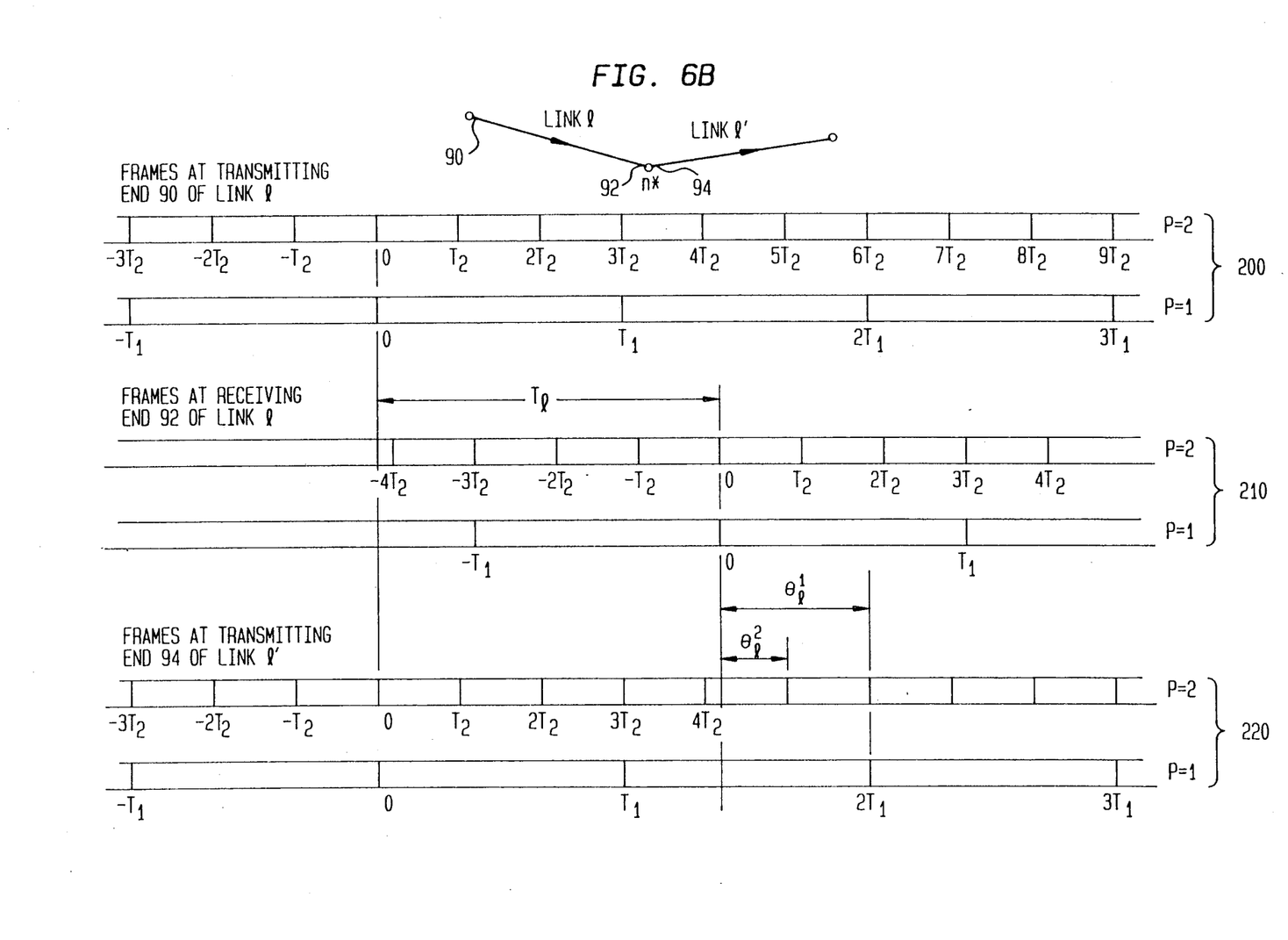
FIG. 6B illustrates frames of multiple sizes at the transmitting end of a link l, at the receiving end of the link l at a node n*, and at the transmitting end of the link l' at the node n*.

FIG. 6B shows a node n* and an incoming link l and a departing link l' . FIG. 6B shows type-p=1 and type-p=2 frames 200 at the transmitting end 90 of link l. FIG. 6B also shows the type-p=1 and type-p=2 frame 210 at the receiving end 92 of the link l at the node n*. Note, that the propagation delay on link l and the processing delay at the receiving end of link l have a combined duration of $\tau_l$. Thus the frames at the receiving end of the link l are delayed $\tau_l$ seconds with respect to frames at the transmitting end of the link l.

FIG. 6B also shows the type-p=1 and type-2 frames 220 departing the node n* at the transmitting end 94 of the link l'. Note that the arriving frames 210 and departing frame 220 at the nod ⓡn* are asynchronous. Thus, $\theta_l^2$ represents the amount of delay which has to be added to the link l for type-2 packets in order to synchronize the arriving and departing type-p=2 frames at the node n*. Similarly, $\theta_l^1$ represents the amount of delay which has to be added to the link l for the type-1 packets in order to synchronize the arriving and departing type-p=1 frames at the node n*.

As indicated above, the inventive multiple frame size congestion control strategy involves an admissions policy at the source node of each connection and a queuing strategy at the network nodes.

The admissions policy is as follows. Every connection in the network is set up as a type-p connection. The admissions policy requires that the packet admission into the network at the source node of any connection k of type-p with the allocated transmission rate $r_k$, be $(r_k,T_p)$ smooth. A packet belonging to a type-p connection is a type-p packet, which packet type is indicated in the packet header.

To prevent clustering of packets and the congestion that results therefrom, the stop-and-go queuing strategy at the nodes is based on the following rules.

(A) A type-p packet which has arrived at a node via an incoming link l in an arriving type-p frame f does not become eligible for service until the beginning of the first type-p departing frame on the appropriate outgoing link which starts after f has expired.

(B) Any eligible type-p packet has non-preemptive priority over type p-1 packets, e.g. type-2 packets have non-preemptive priority over type-1 packets.

Generally, capacity of the links is allocated such that the aggregate transmission rate allocated over link l to all type-p connections, denoted by $C_l^p$ (in bits/sec) satisfies the following:

$$\sum_{p=p_0}^{P} C_l^P \leq C_l - L/T_{p_0}, p_0 = 2, \ldots, P \quad (12)$$

The term $L/T_{p_0}$ in this inequality is a rate in bits/sec equivalent to the transmission of one packet per frame of duration $T_{p_0}$. Therefore, this inequality suggests that for each link l and for any $p_0 \geq 2$, at least one packet per frame of duration $T_{p_0}$ of the link capacity should remain unallocated to the connections of type $p_0$ or higher. This restriction does not apply to $p_0=1$, meaning that any unallocated part of the capacity can always be assigned to connections of type 1. Furthermore, one packet per frame normally accounts for a small percentage of the total link capacity. Therefore, the inequality does not necessitate any waste of capacity, nor does it impose any important restriction on capacity allocations.

It then follows that in the case where the arriving and departing frames are synchronous, a type-p packet which has arrived at a node n via some link l during an arriving type-p frame f will receive service before the type-p frame after f expires. It also follows that each connection k will maintain its original smoothness property throughout the network, i.e. for a connection of type-p with the allocated transmission rate $r_k$, the packet stream maintains the $(r_k,T_p)$ smoothness throughout its path to the destination.

Figure 7:
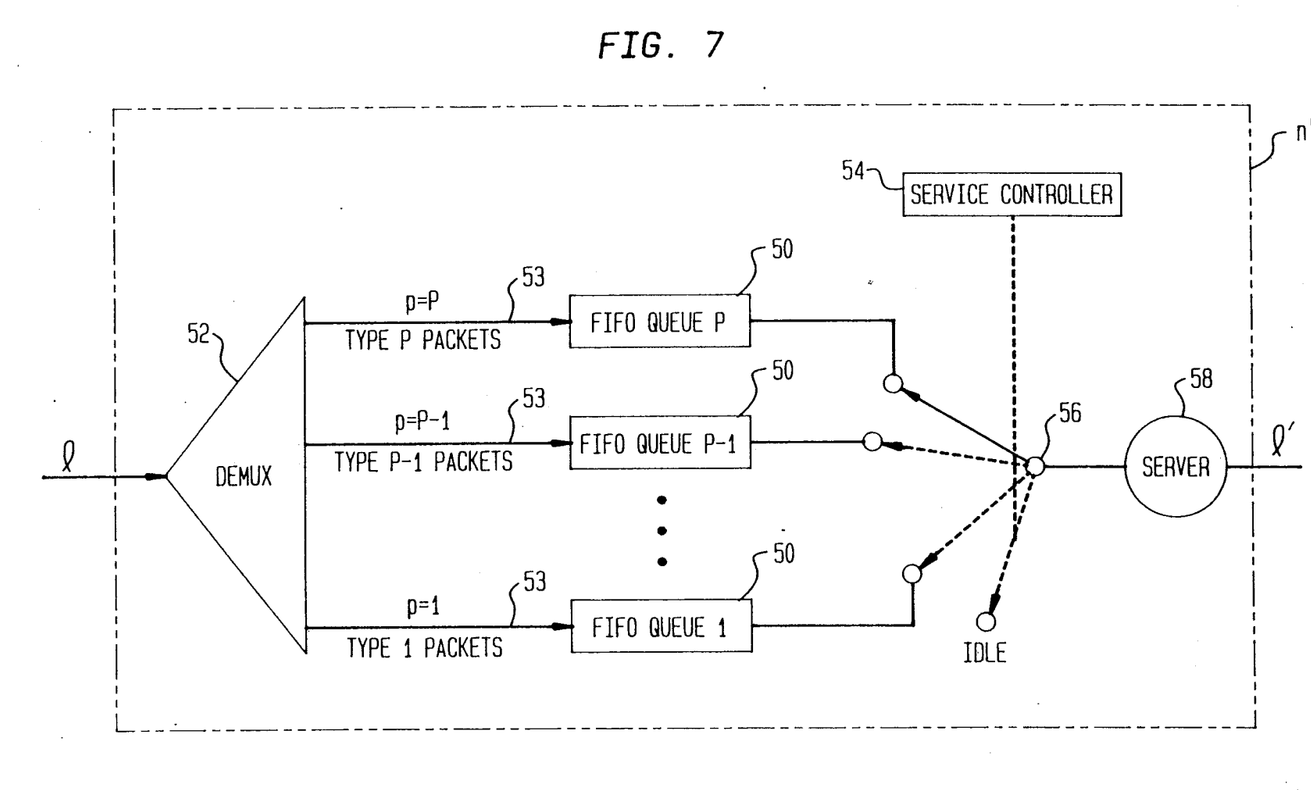
FIG. 7 illustrates a network node which is capable of carrying out the multiple frame size congestion control strategy of the present invention.

A node n" for carrying out the stop-and-go queuing strategy with multiple frame sizes is illustrated in FIG. 7. The node n" is designed for the case where the arriving frames on all incoming links such as link l and the departing frames on all outgoing links such as link l' are synchronous for all frame sizes The node n" comprises a FIFO queue 50 for each frame size and corresponding packet types p=P, p=P-1, ... p=1. If there are only two packet types, i.e. p=2 and p=1, then there are only two queues 50. Packets arriving on the link l are separated onto lines 53 according to packet type-p by the demultiplexer 52 and loaded into the appropriate FIFO queues 50.

In order to comply with the stop-and-go queuing rules A and B stated above, the service controller 54 operates as follows: At the beginning of each type-P frame, p=1,2, ... P, the service controller 54 marks the present load in the type-p queue as eligible for service. At the beginning of each frame of type p=P, the service controller sets the switch 56 so that the server 58 starts serving eligible packets in the type-P queue and continues until the eligible type-p packets are served. In each type-P−1 frame (whose beginning always coincides with the beginning of one type P frame see, e.g., FIG. 6A and FIG. 6B which show type-2 and type-1 frames), after the eligible load of queue P is served, transmission of the eligible load of queue P−1 is started. During each type P−1 frame, service of queue P−1 may several times be interrupted on a non-preemptive basis before its eligible load is transmitted. This is because each time a new type-p frame starts, new packets may become eligible at queue P. Finally, when the eligible load of queue P−1 is served, service of queue P−2 starts. This procedure continues all the way down to queue 1. Once there is no eligible load at any queue, the server 58 is idle.

Figure 8:
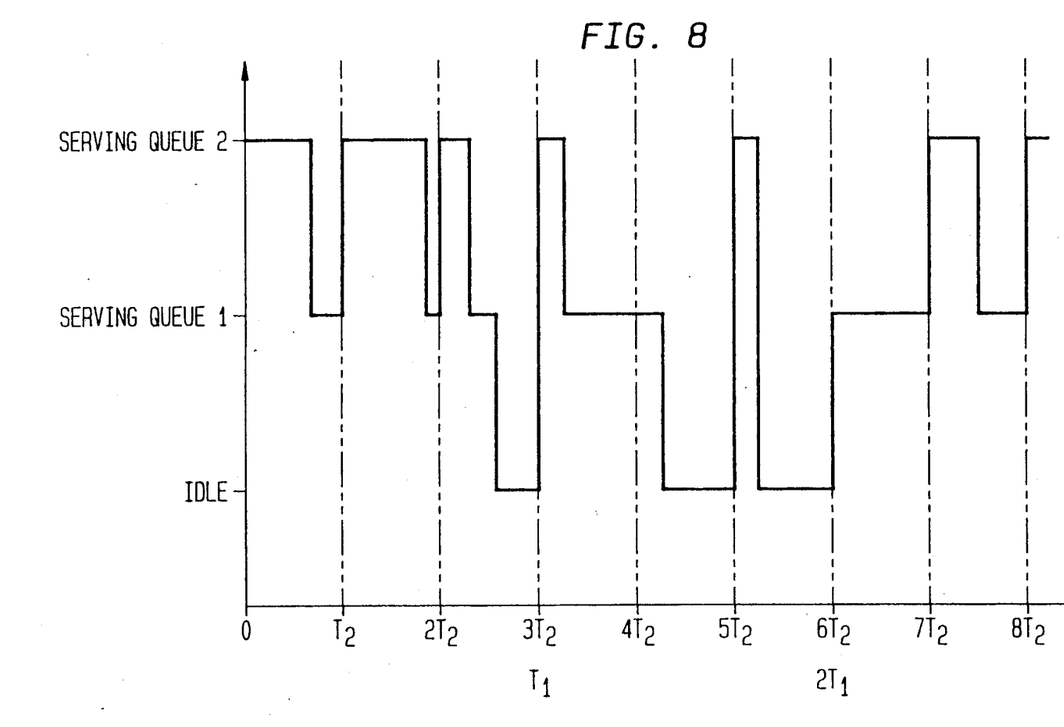
FIG. 8 illustrates a typical pattern of service shifts between queues in the node of FIG. 7.

A typical pattern of service shifts between the queues for the case P=2 is illustrated in FIG. 8. In FIG. 8, the abscissa is a time axis which indicates the times occupied by the type-2 and type-1 frames. The ordinate in FIG. 8 indicates the particular queue being served i.e. queue P=1, queue P=2, or idle. Thus, as can be seen in FIG. 8, the type-2 frames are shorter than the type-1 frames. Therefore, the type-2 packets are of higher priority than the type-1 packets. At the start of each type-2 frame, the eligible packet load of the type-2 queue is served. Only then does the server serve the eligible load of the type-1 queue. Once eligible load of the type-1 queue and the eligible load of the type-2 queue are served, the server is idle. Thus, in the type-2 frame [$2T_2,3T_2$], first the type-2 queue is served, then the type-1 queue is served and then the server is idle. Similarly, in the type-2 frame [$3T_2,4T_2$], the beginning of which coincides with the beginning of the type-1 frame [$T_1,2T_1$], first the type-2 queue is served and only then is the type-1 queue served. Note that service of the type-1 queue is not interrupted at the start of the type-2 frame [$4T_2,5T_{22}$] because there are no higher priority type-2 packets eligible for transmission at this time.

As indicated above in connection with FIG. 6B, in the case where at a node, the frames arriving on all the incoming links are synchronous, but the departing frames on the outgoing links are asynchronous with respect to the arriving frames, an additional delay $\theta_l^p$ may be incorporated into each incoming link l for the type-p packets to synchronize the arriving and departing frames of type-p. This can be accomplished by modifying the function of the service controller 57 of the link l as follows: At the beginning of each type-p frame p=1,2, ... P, the load present in the queue p is marked. This marked load is designated as eligible for transmission $\theta_l^p$ seconds later.

When the arriving and departing frames at a node are synchronous, the total buffer capacity per link l required to eliminate any chance of buffer overflow is $$B_l = \Sigma 2C_l^p T_p \quad (13)$$

This required buffer capacity is always less than $2C_lT_1$. When the arriving and departing frames are asynchronous, the required buffer size per link l can be as large as $$B_l = \Sigma(2T_p + \theta_l^p) \cdot C_l^p \quad (14)$$

This is always smaller than $3T_1C_l$.

The delay D'P associated with a type-p packet may be represented as follows $$D'P = D^P + d^P = t + Q^p + d^p \quad (15)$$

Where $D^p$ is the total connection delay, $d^p$ is the jitter delay, t is the total end-to-end processing and propagation delay, and $Q^p$ is the connection queuing delay for a type-p packet.

Furthermore $$-T_p < d^P < T_p \quad (16)$$

and $$HT_p < Q^P < 2HT_p \quad (17)$$

In addition, it should be noted that in the multiframe case, bandwidth can be allocated to a connection of type-p in incremental steps of $$\Delta r^P = L/T_p \text{ bits/sec} \quad (18)$$

In brief, the required buffer capacity per link for a type-p packet is proportional to $T_p$ as is the queuing delay. On the other hand the incremental bandwidth allocation unit $\Delta r^P$ is inversely proportional to Tp. However, while the queuing delay and incremental bandwidth are coupled together for each type of connection, it is now possible to provide small queuing delays for certain types of connections by choosing a small frame size while allocating bandwidth in fine segments for other types of connections by choosing a larger frame size.

As a numerical example, consider a network with link capacities of 150 Mbits/sec and packet size of L=400 bits. In addition, assume only two frame sizes, $T_1=16$ msec and $T_2=1$ msec, are employed. The incremental unit of bandwidth allocation for type-1 and type-2 connections will be $\Delta r^1=25$ Kbits/sec and $\Delta r^2=400$ kbits/sec. The maximum queuing delay for a type-1 connection with H=5 is $Q^1=160$ msec and the maximum queuing delay for a type-2 connection is $Q^2=10$ msec. This suggests that continuous bit stream oriented traffic with high vulnerability to end-to-end delays should be set up in the network as type-2 connections while low speed data communications services can be designated as type-1 traffic.

The benefits of freedom from congestion and bounded delay provided by the framing congestion control strategy are accomplished at the cost of the admission policy which enforces a smoothness property on packet arrivals, i.e. admitting only $r_k \cdot T$ packets per connection k in each frame of size T. Since an averaging period of only a fraction of a second is insufficient to smooth out the statistical fluctuations of traffic sources, for practical purposes, the admissions policy requires that capacity be allocated based on the peak rates of connections. If the framing strategy is uniformly applied to all of the services in a broadband network, low utilization of transmission capacity may result. This problem can be alleviated by combining the framing congestion control strategy with other traffic management policies.

Figure 9:
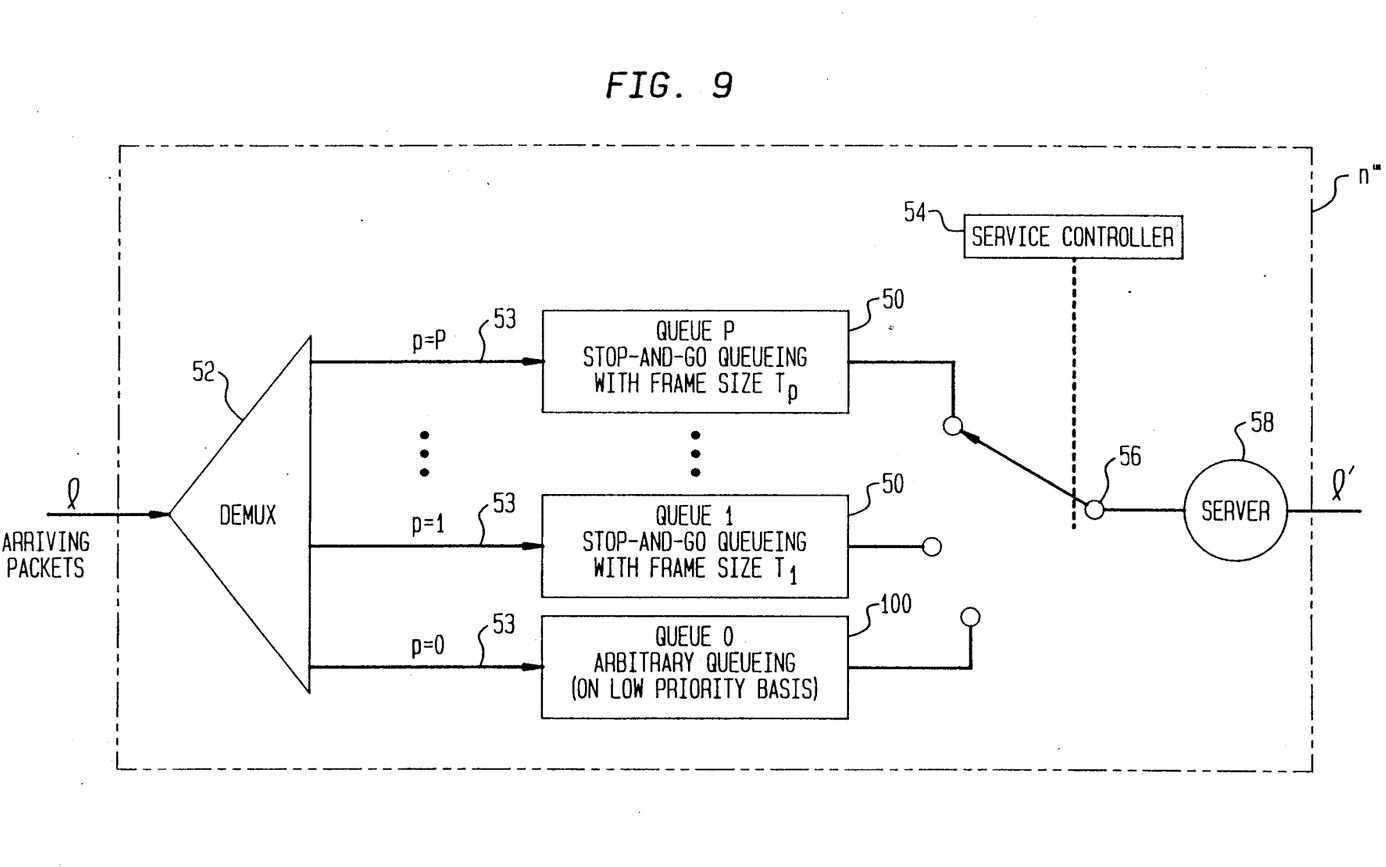
FIG. 9 illustrates an alternative node in which stop-and-go queuing is combined with another queuing discipline.

FIG. 9 schematically illustrates a node n'''. The node n''' of FIG. 9 is the same as the node n'' of FIG. 7 except for the addition of the queue 100. A category of packets referred to herein as type p=0 packets is routed the multiplexer 52 into the queue 100. The service controller 54 controls the switch 56 in the same manner as is done in connection with FIG. 7 except that the queue 100 for type-0 packets has replaced the idle position of the switch 56. Thus during any period of time that none of the queues 50 are being served, the server 58 is connected to queue 100.

This otherwise idle time for the server 58 is composed of two parts.
(a) The fraction of the frames corresponding to any part of the transmission bandwidth not allocated to the traffic of type-$p \geq 1$, and
(b) The fraction of the bandwidth allocated to the traffic of type $p \geq 1$ which is being underutilized by the corresponding sources.

It is important to notice that the new category of traffic may be regulated according to any desired policy or transmitted in any order, and can itself comprise different classes of connections, as well as datagrams, each being subject to a different congestion control policy. As long as the type -0 packets have low priority with respect to the eligible packets of type $p \geq 1$, their presence does not cause any disruption in the proper functioning of the framing strategy, as the type-0 packets are only served when the server would otherwise be idle (In this case the equality (12) above applies when $p_0 = 1, 2, \ldots P$)

In this integrated environment, the framing strategy is best suited for the periodic bit streams, real time traffic, and other services with stringent packet loss or delay requirements, while the bursty services with less sensitivity to loss or delay should be included in the type-0 category.

In short, a framing congestion control strategy for a packet network which utilizes multiple frame sizes has been disclosed. The congestion control strategy comprises an admissions policy for each connection at its source node and a stop-and-go queuing strategy at the network nodes. The multiple frame sizes enable queuing delays to be made small for some connections while enabling bandwidth to be allocated in small increments for other connections.

Finally, the above-identified embodiments of the invention are intended to be illustrative only. Numerous alternative embodiments may be devised by those skilled in the art without departing from the spirit and scope of the following claims.

I claim:

1. A method for transmitting packets in a packet switching network comprising
   for each connection k of a particular type p, p=1, .., P, limiting the number of packets admitted to the network in a frame of duration $T_p$ to $r_k \cdot T_p$, where the frame duration, $T_p$, is selected individually for each connection type p and where $r_k$ is a transmission rate allocated to connection k, and
   at each node in said network, delaying each packet belonging to a connection of type p and arriving at a node in said network in a particular arriving frame of duration $T_p$ at least until said particular arriving frame has expired.

2. The method of claim 1 wherein said delaying step comprises servicing a packet belonging to a connection type p, which has arrived at a node on a particular incoming link during said particular arriving frame of duration $T_p$, during a first departing frame of duration $T_p$ on a particular outgoing link which starts after the end of said particular arriving frame.

3. The method of claim 1 wherein said method also comprising
   transmitting packets belonging to connections of type p between nodes via said links in time frames of duration $T_p$, the duration $T_p$ being chosen individually for each connection type p.

4. A method for transmitting packets in a packets in a packet switching network comprising a plurality of nodes interconnected by links, each of said packets belonging to a connection k of type p, p=1, ... P, said method comprising
   transmitting packets belonging to connections of type p between nodes via said links in time frames of duration $T_p$, the duration $T_p$ being chosen individually for each connection type p
   limiting the number of packets being transmitted by a connection k of type p and being admitted to the network at a source node for connection k in one of said frames of duration $T_p$ to $r_k \cdot T_p$ for each link traversed by the connection k, $r_k$ being a transmission rate allocated to connection k, wherein each packet of a connection k of type p arriving at each node via an incoming link in a particular arriving frame of duration $T_p$ and destined for a particular outgoing link is delayed and then transmitted via said particular outgoing link in a first departing frame of duration $T_p$ which starts at or after the end of the said particular arriving frame.

5. The method of claim 4 wherein said arriving and departing frames are synchronous.

6. The method of claim 4 wherein said arriving and departing frames are asynchronous.

7. THe method of claim 4 where $T_p$ is an integral multiple of $T_{p+1}$.

8. A method for transmitting packets in a packet switching network comprising a plurality of nodes interconnected by links, each of said packets belonging to a connection k of type p, p=1, ... P, said method comprising
   transmitting packets belonging to connections of type p between nodes via said links in time frames of duration $T_p$, the duration $T_p$ being chosen individually for each connection type p, the number of packets being transmitted by a connection k of type p in one of said frames of duration $T_p$ being bound by $r_k \cdot T_p$ for each link traversed by the connection k, $r_k$ being a transmission rate allocated to connection k,
   transmitting each packet of a connection k of type p arriving at a node via an incoming link in a particular arriving frame of duration $T_p$ and destined for a particular outgoing link via said particular outgoing link in a first departing frame of duration $T_p$ which starts at or after the end of said particular arriving frame, wherein $T_p$ is an integral multiple of $T_{p+1}$, and
   delaying a higher priority packet belonging to a connection of type p which becomes eligible for service by an outgoing link while a lower priority packet belonging to a connection of type p-1 is being served, until service of said type p-1 packet is completed before gaining priority over the outgoing link.

9. A method for transmitting packets in a packet switching network comprising a plurality of nodes interconnected by links, each of said packets belonging to a connection k of type p, p=1, ... P, said method comprising transmitting said packets between nodes via said links in time frames, packets belonging to type p connections being transmitted in frames of duration $T_p$, where $T_p$ is chosen individually for each type p, limiting the number of packets admitted to the network in a frame of duration $T_p$ to $r_k \cdot T_p$ where $r_k$ is a transmission rate allocated to connection k, and delaying each of said packets at each of said nodes so that each of said packets, belonging to a type p connection and arriving at one of said nodes via an incoming link during a particular one of said frames of duration $T_p$ and destined for a particular outgoing link, is transmitted from said one node via said particular outgoing link in a frame of duration $T_p$ which begins at or after the end of the frame of duration $T_p$ in which the packet arrived at said one node.

10. The method of claim 9 wherein each connection k of type p is allocated a rate $r_k$ and the maximum number of packets belonging to a connection k of type p which can be transmitted in a frame of duration $T_p$ is $r_k \cdot T_p$.

11. A node for use in a packet network for routing packets, each of said packets belonging to a connection k of type p, p=1, ..., P, said node comprising receiving means for receiving said packets via one or more incoming links, said receiving means receiving said packets belonging to a connection k of type p in arriving frames of different durations $T_p$, where $T_p$ is chosen individually for each connection type p, and means for delaying each of said packets such that each of said packets belonging to a connection k of type p is transmitted in a first departing frame of duration $T_p$ on the desired outgoing link which starts at or after the end of the arriving frame of duration $T_p$ in which the packet arrived at the node.

12. A node for use in a packet network for routing packets, each of said packets belonging to a connection k of type p, p=1, ..., P said node comprising receiving means for receiving said packets via one or more incoming links, said receiving means receiving said packets belonging to a connection k of type p in arriving frames of duration $T_p$, where $T_p$ is chosen individually for each connection type p, and transmitting means for transmitting each of said packets on a desired outgoing link, each packet belonging to a connection k of type p being transmitted in a first departing frame of duration $T_p$ on the desired outgoing link which starts at or after the end of the arriving frame of duration $T_p$ in which the packet arrived at the node, wherein $T_p$ is an integral multiple of $T_{p+1}$ and wherein packets belonging to a connection of type p which become eligible for service by an outgoing link while lower priority packets belonging to a connection of type p−1 are being served, wait until service of said type p−1 packets is completed before gaining priority over the outgoing link.

13. The node of claim 12 wherein said receiving means comprises demultiplexing means for separating packets belonging to connections of different types p, and buffer means associated with each connection type p for storing said packets, and said transmitting means comprises serving means for serving said buffer means so that packets belonging to a connection of type p which become eligible for service by an outgoing link while lower priority packets belonging to a connection of type p−1 are being served, wait until service of said type p−1 packets is completed before gaining priority over the outgoing link.

14. The node of claim 13 wherein said node includes additional buffer means for packets not belonging to one of said type p connections, said additional buffer means having a lower priority for service by said serving means than said buffer means associated with each connection type p.

15. A method for transmitting packets in a packet switching network comprising a plurality of nodes interconnected by links, said method comprising for each connection k of a particular type p, p−1, ..., P, limiting the number of packets admitted to the network in a frame of duration $T_p$ to $r_k \cdot T_p$ where $T_p$ is selected individually for each connection type p and where $r_k$ is a transmission rate allocated to connection k, transmitting packets belonging to different connection types between nodes in frames of different sizes, and delaying each of said packets at each of said nodes so that each packet arriving at one of said nodes via a particular incoming link in a particular arriving frame of a particular size is transmitted from said one node on a particular outgoing link in a first outgoing frame of said particular size which starts after said particular incoming frame expires.

* * * * *